United States Patent
Murakami et al.

(10) Patent No.: US 6,865,068 B1
(45) Date of Patent: *Mar. 8, 2005

(54) CARBONACEOUS MATERIAL, ITS PRODUCTION PROCESS AND ELECTRIC DOUBLE LAYER CAPACITOR EMPLOYING IT

(75) Inventors: Kazuyuki Murakami, Tokyo (JP); Yasuhiro Mogi, Tokyo (JP); Kazuteru Tabayashi, Tokyo (JP); Toru Shimoyama, Kanagawa (JP); Kazuhiko Yamada, Kanagawa (JP); Yasuo Shinozaki, Kanagawa (JP)

(73) Assignees: Asahi Glass Company, Limited, Tokyo (JP); JFE Chemical Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 147 days.

(21) Appl. No.: 09/559,073

(22) Filed: Apr. 27, 2000

(30) Foreign Application Priority Data

Apr. 30, 1999 (JP) .......................... 11-123378
Jul. 16, 1999 (JP) .......................... 11-202972

(51) Int. Cl.$^7$ .......................... H01G 9/55; B01J 20/02; C01B 31/08
(52) U.S. Cl. .................... 361/502; 29/25.03; 264/105; 423/445 R; 502/416
(58) Field of Search .................. 361/502, 505, 361/523, 525; 423/445 R, 414; 29/25.03; 264/105; 502/416

(56) References Cited

U.S. PATENT DOCUMENTS

| | | | |
|---|---|---|---|
| 5,304,527 A | | 4/1994 | Dimitri ...................... 502/425 |
| 5,603,867 A | * | 2/1997 | Ohsaki et al. ............... 252/502 |
| 5,754,393 A | * | 5/1998 | Hiratsuka et al. ............ 361/505 |
| 5,877,935 A | | 3/1999 | Sato et al. ................... 361/502 |
| 6,038,123 A | | 3/2000 | Shimodaira et al. ......... 361/502 |
| 6,241,956 B1 | * | 6/2001 | Saito et al. ............... 423/445 R |
| 6,737,445 B2 | * | 5/2004 | Bell et al. ...................... 521/99 |
| 6,738,252 B2 | * | 5/2004 | Okamura et al. ............ 361/502 |
| 6,773,466 B1 | * | 8/2004 | Hiratsuka et al. ........... 29/25.03 |

FOREIGN PATENT DOCUMENTS

| JP | 2-297915 A | * 12/1990 | .................. 361/502 |
|---|---|---|---|
| JP | 5-243092 A | * 9/1993 | .................. 361/505 |

OTHER PUBLICATIONS

Patent Abstracts of Japan, vol. 1996, No. 09, Sep. 30, 1996 for JP 08 119614, May 14, 1996.

Patent Abstracts of Japan, vol. 0164, No. 79, Oct. 6, 1992 for JP 04 175277, Jun. 23, 1992.

Patent Abstracts of Japan, vol. 1996, No. 07, Jul. 31, 1996 for JP 08 083736, Mar. 26, 1996.

U.S. Appl. No. 09/517,579, filed Mar. 2, 2000, pending.

* cited by examiner

*Primary Examiner*—Wayne A. Langel
(74) *Attorney, Agent, or Firm*—Oblon, Spivak, McClelland, Maier & Neustadt, P.C.

(57) ABSTRACT

A carbonaceous material having a total pore volume of from 0.5 to 1.5 cm$^3$/g per unit mass, a volume of micropores having diameters of from 10 to 20 Å of from 10 to 45% based on the total pore volume, a volume of mesopores having diameters of from 20 to 200 Å of from 35 to 65% based on the total pore volume, a volume of macropores having diameters exceeding 200 Å of not more than 15% based on the total pore volume, and a specific surface area of from 1,000 to 2,500 m$^2$/g. The carbonaceous material is incorporated into an electric double layer capacitor to provide increased capacitance.

23 Claims, No Drawings

CARBONACEOUS MATERIAL, ITS PRODUCTION PROCESS AND ELECTRIC DOUBLE LAYER CAPACITOR EMPLOYING IT

The present invention relates to a porous carbonaceous material useful for an electrode for e.g. an electric double layer capacitor, its production process, and an electric double layer capacitor employing said carbonaceous material. The electric double layer capacitor of the present invention can be widely used for power sources for portable apparatus, standby power sources for domestic electrical equipment, UPS for optical communication, power sources for electric automobiles and the like.

As a conventional electric double layer capacitor, a coin type obtained in such a manner that an element having a pair of electrodes consisting mainly of activated carbon and formed on a current collector and a separator sandwiched therebetween, together with an electrolytic solution, is sealed in a metal case by means of a metal lid and a gasket insulating the case from the lid, and a wound type obtained in such a manner that a pair of sheet electrodes is wound by means of a separator interposed therebetween to obtain a wound electrode, which is accommodated in a metal case together with an electrolytic solution, and sealed in the case so that the electrolytic solution does not evaporate from an opening of the case, have been known.

Further, for an application which requires a large current and a large capacitance, a stack type electric double layer capacitor having an element obtained by stacking a large number of sheet electrodes by means of a separator interposed therebetween, incorporated therein, has been proposed (JP-A-4-154106, JP-A-3-203311, JP-A-4-286108). Namely, a plurality of sheet electrodes formed into a rectangle as positive electrodes and negative electrodes, are alternately stacked one on another by means of a separator interposed therebetween to obtain a stacked element, a positive electrode lead material and a negative electrode lead material are connected with the respective terminals of the positive electrodes and the negative electrodes by caulking, and the element in such a state is accommodated in a case, impregnated with an electrolytic solution and sealed with a lid.

Conventionally, the electrode constituting an electric double layer capacitor, has been one made essentially of activated carbon having a large specific surface area, and as the electrolytic solution, a solvent having a high dielectric constant such as water or propylene carbonate, has been used so as to dissolve an electrolyte at a high concentration.

In such an electrode made mainly of activated carbon, the charge of the electric double layer formed on the surface of the activated carbon itself contributes to the capacitance of the electric double layer capacitor, and thus activated carbon having a large specific surface area has been employed. However, the specific surface area of activated carbon is a level of 3,000 $m^2/g$ at largest at present, and the capacitance per unit volume of an electric double layer capacitor employing it almost reaches the limit in fact.

On the other hand, in the charging and discharging cycles of a capacitor, the charging and discharging properties are controlled by the rate of migration of electrolyte ions through the pores in the activated carbon. If the specific surface area increases, finer pores will increase in the activated carbon, and in these finer pores, as mentioned hereinafter, ions are less likely to move smoothly, conducting path will decrease, and such a phenomenon that the resistance of the activated carbon itself will increase, may arise.

It is commonly said that the capacitance of an electrode per unit area of the electrode is from 20 to 30 $\mu F/cm^2$ at the interface between water and mercury. However, with an electrode employing activated carbon, only a small value of about 5 $\mu F/cm^2$ has been obtained.

The capacitance of a capacitor per unit area of the electrode is considered to be greatly influenced by physical properties of both solid (electrode) and liquid (electrolytic solution), from its constitution and operation principle. With respect to the electrolytic solution, various solvents, electrolytes, etc., have been studied, and it can be considered that the electrolytic solution is almost optimized. On the contrary, with respect to the solid, a porous electrode made mainly of activated carbon has been often used, and various studies W have been made to improve its properties. However, as mentioned above, the capacitance is still extremely low.

Various explanations have been made for the reasons therefor, and one of which is that the relation between the rate of migration of the electrolyte ions through the pores and the specific surface area has not been optimized.

It is considered that one of the reasons is, for example, that the electrolyte ions can not adequately go into the inside of the pores of the activated carbon, since the pore diameters are too small. Namely, even when activated carbon having a large specific surface area is produced in order to make the capacitance of a capacitor high, if the diameters of the pores are smaller than the diameter of the electrolyte ions, a so-called "useless surface" which makes no contribution to making the capacitance high, will increase. Accordingly, not only the capacitance of the entire electrode does not increase, but it may decrease in some cases.

The electrolyte ions in a solvent are usually associated with solvent moleculars (salvation), and accordingly, it is considered to be necessary to optimize the diameters of the pores in the activated carbon so that they are large enough as compared with the maximum diameter of the electrolyte ions considering the solvation, in order to make the capacitance of a capacitor high. Namely, the pore size distribution of the activated carbon which is to be an electrode, is required to be optimized in a relative relation with the ion size of the electrolyte.

However, if the diameters of the pores in the activated carbon are made large, the volume of the pores of the entire activated carbon will be high, whereby the bulk density of the activated carbon will decrease. Accordingly, when a capacitor cell is constituted by employing activated carbon having large pore diameters, the mass of the activated carbon to be filled per unit volume of the cell will reduce, and the energy to be stored per unit volume tends to decrease. Accordingly, it is required for an electrode material for an electric double layer capacitor that the energy to be stored per unit volume will be maximum from practical viewpoint.

From this point of view, some attempts have been conventionally proposed to define e.g. the correlation among e.g. micropores, mesopores and macropores of a carbonaceous material such as activated carbon, to be used for an electrode for an electric double layer capacitor (JP-A-5-811, JP-A-6-56416, JP-A-8-119614, JP-A-8-153653, JP-A-10-208985, JP-A-10-297912). However, only partial optimization has been achieved in every case, and no attempt has been made to optimize the whole relation among the three kinds of pores.

Here, activated carbon is produced usually by carbonizing and activating a carbon source derived from a plant such as sawdust or coconut shell, a carbon source derived from a coal/petroleum material such as coke or pitch, or a synthetic high polymer carbon source such as a phenolic resin, a furfuryl alcohol resin or a vinyl chloride resin.

Further, the carbonization is carried out usually by heating a carbon source in a non-oxidizing atmosphere at a temperature of from 300° C. to 2,000° C. The activation is carried out by heating the carbonized product thus obtained in a weak oxidizing gas containing carbon dioxide or water vapor to a temperature of from 500° C. to 1,100° C., so as to oxidize and exhaust the carbonized product to be pore structure and to increase the surface area (gas activation). Otherwise, the carbonized product is mixed with an alkali metal hydroxide (such as KOH) in an amount of several times the mass of the carbonized product, and then the mixture is heated at a temperature ranging from the melting point of said metal hydroxide to 1,000° C., in an inert gas atmosphere for from several tens minutes to 10 hours, preferably from several tens minutes to about 5 hours, so as to increase the surface area (activation by alkali metal hydroxide). After the activation has been completed, the alkali metal hydroxide is removed by adequate washing.

The pore structure of the activated carbon thus obtained, is basically determined, for the most part, by the nature of the carbon source. Accordingly, it has been difficult to obtain a pore structure suitable for an electric double layer capacitor, even by somewhat changing the production conditions.

The present invention has been made to overcome the above-mentioned problems of the prior art, and it is an object of the present invention to provide a carbonaceous material having a large specific surface area, with which a high capacitance will be obtained, its production process, and an electric double layer capacitor having a high capacitance and a high reliability, employing said carbonaceous material as an electrode material.

According to the present invention, a carbonaceous material, a process for producing a carbonaceous material, a carbonaceous material obtained by said production process, and an electric double layer capacitor employing such a carbonaceous material as an electrode material, as mentioned below, will be provided.

(i) A carbonaceous material which has a total pore volume of from 0.3 to 2.0 cm³/g per unit mass, a volume of micropores having diameters of from 10 to 20 Å of from 10 to 60% based on the total pore volume, a volume of mesopores having diameters of from 20 to 200 Å of from 20 to 70% based on the total pore volume, a volume of macropores having diameters exceeding 200 Å of not more than 20% based on the total pore volume, and a specific surface area of from 1,000 to 2,500 m²/g.

(ii) A process for producing a porous carbonaceous material, which comprises the following steps (1) to (4):

(1) a step of curing a liquid thermosetting resin which contains a volatile component having a boiling point of from 120 to 400° C. and which has a viscosity of from 0.1 to 100 Pa·s at 25° C., to obtain a cured product;

(2) a step of pulverizing the cured product;

(3) a step of carbonizing the cured product thus pulverized in a non-oxidizing atmosphere so that the mass reduction till 400° C. in the carbonization is from 2 to 50 mass % of the mass before carbonization, to obtain a carbonized product; and (4) a step of activating the carbonized product.

(iii) The carbonaceous material according to the above (i) obtained by the above process (ii).

(iv) An electric double layer capacitor which has electrodes comprising the carbonaceous material as defined in the above (i) or (iii).

Now, the present invention will be described in detail with reference to the preferred embodiments.

The carbonaceous material of the present invention is a porous carbonaceous material wherein the total pore volume is from 0.3 cm³/g to 2.0 cm³/g, ① the volume of micropores having diameters of from 10 to 20 Å constitutes from 10 to 60% of the total pore volume, ② the volume of mesopores having diameters of from 20 to 200 Å constitutes from 20 to 70% of the total pore volume, ③ the volume of macropores having diameters exceeding 200 Å constitutes not more than 20% of the total pore volume, and the specific surface area is from 1,000 to 2,500 m²/g. In the present invention, "diameters of from 10 to 20 Å" means diameters of at smallest 10 Å and smaller than 20 Å, and "diameters of from 20 to 200 Å" means diameters of at smallest 20 Å and not larger than 200 Å.

In the carbonaceous material of the present invention, basically, the micropores having diameters of from 10 to 20 Å effectively contribute to appearance of the capacitance, and the mesopores having diameters of from 20 to 200 Å mainly play a role to transport the electrolytic solution from the outer surface of carbonaceous material particles into the inside micropores, so as to supply the micropores with electrolyte ions. Further, macropores having diameters exceeding 200 Å make substantially no contribution to e.g. appearance of the capacitance, and lead the bulk density of the carbonaceous material to decrease.

According to the present invention, the volume of micropores, the volume of mesopores and the volume of macropores are optimized as follows.

Namely, in the carbonaceous material of the present invention, the volume of micropores having diameters of from 10 to 20 Å, to which the electrolyte ions are accessible, constitutes from 10 to 60%, preferably from 10 to 45%, more preferably from 10 to 25%, of the total pore volume. Accordingly, most of the capacitance which is to appear, is attributable to the pores of this size. If the ratio of the volume of pores having diameters of from 10 to 20 Å to the total pore volume is lower than this range, no adequate capacitance will be obtained, and if it is higher than this range, the bulk density of the carbonaceous material will be high, and it tends to be difficult to fill the carbonaceous material in an amount required per unit volume, in an electrode assembly.

Further, the volume of mesopores having diameters of from 20 to 200 Å constitutes from 20 to 70%, preferably from 35 to 65%, more preferably from 40 to 60%, of the total pore volume. If the ratio of the volume of pores having diameters of from 20 to 200 Å to the total pore volume is lower than this range, no adequate amount of electrolyte ions can be supplied to the micropores, and thus the amount of the electrolyte ions held in the inside of the carbonaceous particles will be inadequate, whereby no adequate capacitance will be obtained. Further, if it is higher than this range, the bulk density of the carbonaceous material tends to be too low, whereby it tends to be difficult to fill the carbonaceous material in an amount required per unit volume, when an electrode assembly is formed.

As mentioned above, the pores having this size, have a small surface area, and accordingly, they mainly play a role to supply the micropores having diameters of from 10 to 20 Å in charge of appearance of the capacitance, with an adequate amount of electrolyte ions, rather than make a direct contribution to increase of the capacitance.

Further, in the carbonaceous material of the present invention, the volume of macropores having diameters exceeding 200 Å, constitutes not more than 20%, preferably not more than 15%, more preferably not more than 10%, of the total pore volume, and substantially no macropore has to be incorporated. Large pores having diameters exceeding 200 Å, not only make no contribution to increase of the capacitance since they have a small specific surface area, but also decrease the bulk density of the carbonaceous material. Accordingly, when the upper limit of the amount of such pores present is defined to be within the range of the present invention, an electrode having a high energy density per unit volume will be provided.

In the carbonaceous material of the present invention, the volume of micropores, the volume of mesopores and the volume of macropores are optimized, and further, the total pore volume and the total specific surface area are defined as follows.

The total pore volume is from 0.3 to 2.0 cm$^3$/g, preferably from 0.5 to 1.5 cm$^3$/g, more preferably from 0.5 to 1.0 cm$^3$/g. If the total pore volume is smaller than this range, no adequate capacitance will be obtained, and if it larger than this range, the electrical resistance of the carbonaceous material tends to increase, and the bulk density tends to decrease.

Further, the specific surface area is from 1,000 to 2,500 m$^2$/g, preferably from 1,000 to 2,200 m$^2$/g, more preferably from 1,000 to 1,500 m$^2$/g. If the specific surface area is smaller than this range, no adequate capacitance will be obtained, and if it is larger than this range, the bulk density of the carbonaceous material tends to decrease.

The carbonaceous material of the present invention having the above properties can be obtained by the production process of the present invention comprising the following steps.

(1) Firstly, a liquid thermosetting resin which contains a volatile component having a boiling point of from 120 to 400° C., preferably from 150 to 380° C., more preferably from 180 to 350° C., and which has a viscosity at 25° C. of from 0.1 to 100 Pa·s, preferably from 0.2 to 80 Pa·s, more preferably from 0.5 to 50 Pa·s, is cured to obtain a cured product.

The volatile component may be a dimer or trimer contained in the thermosetting resin and consisting of polymer units constituting the resin, or a solvent having a boiling point within the above range may be added and incorporated in the resin to take said solvent as the volatile component. In the present invention, in the case where the solvent is added to the thermosetting resin, the viscosity at 25° C. means the viscosity of the resin having the solvent added thereto (i.e. the viscosity of the resin immediately before the curing). Further, by using a thermosetting resin having a viscosity within the above range, when it is cured in the air or in a non-oxidizing atmosphere, such a cured product that the mass reduction till 200° C. is from 2 to 50 mass % of the mass before curing, will be obtained.

If the viscosity of the thermosetting resin is higher than the above range, the volatile component is less likely to be dispersed uniformly in the thermosetting resin. On the other hand, if the viscosity is lower than the above range, the fixed carbon content will significantly decrease when the resin is carbonized, whereby the density of the carbonized product to be obtained, i.e. the density of the carbonaceous material after activation, will significantly decrease, and accordingly, when said carbonaceous material is used as an electrode material for an electric double layer capacitor, the energy density per unit volume of the capacitor will decrease.

Here, the viscosity of the resin may be controlled mainly by the amount of the volatile component contained, but the amount of the volatile component to obtain a suitable viscosity is different depending upon the molecular weight of the resin itself and the volatile component species. Accordingly, in the production process of the present invention, the amount of the volatile component is not particularly limited so long as the viscosity of the resin is within the above-specified range.

Further, if the boiling point of the volatile component contained in the thermosetting resin is lower than the above range, the volatile component such as the solvent will evaporate from the system and will not be included in the resin during the curing of the resin, and thus the pore formation may not be lead in the carbonization step. On the other hand, if the boiling point of the volatile component contained is higher than the above specified range, carbonization of the resin component may proceed before volatilization, and accordingly, e.g. cracks may form on the carbonized product when the volatile component evaporates from the system, and excessively large pores may form. As a result, the density of the obtained carbonized product may extremely decrease.

In the present invention, as the boiling point of the volatile component and the viscosity of the source resin for the carbonaceous material are specified to be within the above ranges, the resin will keep an appropriate fluidity during curing process, and will be completely cured while including the solvent and the volatile component therein. Such components included therein and decomposed components of the resin will moderately evaporate from the cured components during the carbonization to form pores as vent holes for a gas, and accordingly, relatively large mesopores having diameters of about 20 to about 200 Å will have already been formed after the carbonization.

It is considered that the presence of such relatively large mesopores will accelerate formation of micropores having diameters of from 10 to 20 Å, since a reactive gas (activation gas) such as steam or carbon dioxide will be homogeneously diffused into the inside of the carbonized product in the following activation step.

Further, it is considered that as the viscosity and the boiling point of the volatile component are defined to be within the above specified appropriate ranges, the formation of the macropores having diameters exceeding 200 Å is limited to a certain level, and the carbonaceous material wherein the pore structures of micropores, mesopores and macropores are optimized, as defined in the present invention, will finally be obtained.

As the thermosetting resin to be used in the present invention, a phenolic resin, a melamine resin, a urea resin, a furan resin, an epoxy resin, an alkyd resin, an unsaturated polyester resin or a diallylphthalate resin may, for example, be employed. A phenolic resin is most preferred from the viewpoint of easiness in handling in the production, high yield of carbonization and easiness in pore control.

As the volatile component, in addition to a component contained in the thermosetting resin, such as a diner or trimer of polymer units constituting an unreacted phenol or phenolic resin, a solvent having a boiling point of from 120 to 400° C., such as a glycol or a polyol such as ethylene glycol, tetramethylene glycol, propylene glycol, trimethylene glycol or glycerol, an alcohol such as octanol or butanol, a ketone such as cyclohexanone, acetophenone or methyl butyl ketone, an amine such as ethanolamine or diethylamine, or an ether such as anisole, may be added to the resin.

In such a case, a kneading step may be carried out in which a curing agent is added to the resin in an amount of at least 1 mass %, preferably from 5 to 20 mass %, based on the resin, followed by kneading, and a curing accelerator is added thereto in an amount of at most 5 mass %, preferably from 0.25 to 1.0 mass %, followed by kneading, to obtain a kneaded product, and then the curing step may be carried out to cure the kneaded product.

The type of the kneader to carry out said kneading, it not particularly limited, and preferred is one capable of kneading the liquid resin with the solvent, the curing agent in a powder form or the curing accelerator, so that they are uniformly mixed. Such a kneader may be either a container-rotation type kneader in which the container itself rotates, or a container-fixed type kneader in which a rotor blade is attached in the fixed container. Examples of the former include horizontal cylinder type, tilted cylinder type, V type, double cone type and equilateral cube type, examples of the latter include ribbon type, monoaxial rotor type, pug mill type, meteor motion type, high speed fluidization type and rotational motion type, and any of these may be suitably used.

The above resin (or the resin kneaded product) is usually cured at a temperature range at which a thermosetting resin is usually cured, e.g. at a temperature of from 150 to 350° C., preferably from 180 to 250° C., whereby the solvent or the volatile component such as a dimer or trimer as polymer units constituting the resin, contained in the resin, evaporates from the system with moderately stirring the system, and part of which will remain in the system, and a cured product having moderately mesoporous structure therein, which is likely to be activated, will be obtained.

In the case of using a phenolic resin as the thermosetting resin, either a resol resin or a novolak resin may be used. In the case of a resol resin, it is used with adding no curing agent, and in the case of a novolak resin, a curing agent such as formaldehyde or hexamethylenetetramine is added thereto, and preferably, an acid such as oxalic acid or salicylic acid as a curing accelerator is added thereto, followed by heating at a temperature of from 150 to 350° C., preferably from 180 to 250° C., for from 10 to 360 minutes, preferably from about 10 to about 120 minutes.

The amount of the curing agent is preferably at least 1 mass %, and if it is less than 1 mass %, the cross-linking density will not increase, the fixed carbon content will decrease, and the bulk density will decrease. Further, the amount of the curing accelerator is preferably at most 5 mass %. The ratio of the mesopores may increase according to the addition amount, however, the ratio of the mesopores will no longer increase even if the curing accelerator is added in an amount exceeding 5 mass %.

Here, the apparatus for curing is not particularly limited, and any of a fixed-bed heating furnace, an electric furnace and the like, may be suitably used.

(2) Then, the cured product thus obtained is pulverized.

The type of the pulverizer is not particularly limited, and preferred is one capable of pulverizing the cured product to at largest several tens mm or smaller, preferably several mm or smaller, more preferably 1 mm or smaller. Such a pulverizer may, for example, be a Dodge crusher, a double-roll crusher, an edge runner, a jaw crusher, a cone crusher, a hammer mill, a rotary crusher, a desk crusher, a rod mill, a ball mill, a tube mill, a roller mill, an attrition mill, a jet mill, a micron mill or a micromizer.

(3) Then, the cured product thus pulverized is carbonized in a non-oxidizing atmosphere.

The carbonization is a conversion process of a carbon precursor comprising the thermosetting resin such as a phenolic resin into a solid carbon having a carbon network. The carbonization is carried out by heating the cured product thus pulverized in a non-oxidizing atmosphere of an inert gas such as nitrogen, argon, helium, xenone, neon, carbon dioxide or combustion exhaust gas or a gas mixture thereof, at a temperature of from 300 to 2,000° C., preferably from about 500 to about 1,000° C., for from 10 minutes to 80 hours, preferably from 10 minutes to 30 hours.

The apparatus for carbonization is not particularly limited, and any of a fixed-bed heating furnace, a fluidized bed heating furnace, a moving bed heating furnace, an inner heat or exothermic rotary kiln, an electric furnace and the like, may be suitably used.

In the carbonization process, the volatile component remaining in the cured resin will evaporate as a gas, to form mesopores having diameters of from 20 to 200 Å. Quantitatively expressed, the mass reduction from room temperature till 400° C. in the carbonization, as measured by e.g. a thermobalance, is from 2 to 50 mass %, preferably from 5 to 40 mass %, more preferably from 5 to 30 mass %, of the mass before carbonization. If the mass reduction is smaller than this range, the volume of the pores formed by evaporating of the volatile component is inadequate, and if it is too large, the density of the carbonaceous material to be obtained in the following activation process will excessively decrease.

(4) Lastly, the carbonized product is activated to obtain a porous carbonaceous material.

The activation is a process to grow and develop the pore structure of the solid carbon formed by the carbonization process into a finer structure. The activation is carried out, in the case of the gas activation, by heating the carbonized product in a weak oxidizing activation gas atmosphere containing at least one member selected from the group consisting of steam, carbon dioxide, oxygen, hydrogen chloride, chlorine and the like, at a temperature of preferably from 500 to 1,100° C., more preferably from 700 to 1,000° C., for from about 5 minutes to about 10 hours. Further, in the case of activation by an alkali metal hydroxide, it is carried out by mixing the carbonized product with at least one member selected from the group consisting of potassium hydroxide, sodium hydroxide, lithium hydroxide, rubidium hydroxide and cesium hydroxide, preferably with potassium hydroxide, in an amount of from 0.2 to 5.0 times the mass of the carbonized product, and heating the mixture at a temperature of at least the melting point of the alkali metal hydroxide, preferably from 300 to 1,000° C., more preferably from 400 to 900° C., for from 30 minutes to 10 hours, preferably from 80 minutes to 5 hours, in an inert gas or non-oxidizing gas atmosphere. The activation may be carried out by combining the above gas activation with the activation by an alkali metal hydroxide and repeating them for several times. In such a case, the treatment conditions may be optionally changed in order that the pore structures of the carbonaceous material subjected to activation treatment are within the desired ranges.

The apparatus for activation is not particularly limited, and the same apparatus as in the carbonization may be used. Any of a fixed-bed heating furnace, a fluidized bed heating furnace, a moving bed heating furnace, an inner heat or exothermic rotary kiln, an electric furnace and the like, may be suitably employed.

By the above activation process, a large amount of micropores having diameters of from about 10 to about 20 Å will be formed. Here, it is preferred to select the activation conditions so that the mass reduction rate of the carbonaceous material in the activation is from 30 to 90 mass %, more preferably from 50 to 80 mass %, in the case of the gas activation, or from 5 to 50 mass %, more preferably from 10 to 40 mass %, in the case of the activation by an alkali metal hydroxide, whereby the pore volume and the specific surface area will be within more appropriate ranges.

The pore properties such as the pore diameter, the pore volume and the specific surface area in the present invention, are represented by values as measured by using Autosorb-1 manufactured by Quantachrome (or an apparatus having a function equal thereto) as follows.

The pore diameter and the pore volume are obtained in such a manner that a sample preliminarily dried in vacuum at 200° C. for at least 12 hours, is provided to a nitrogen gas adsorption at a temperature of liquid nitrogen to obtain an adsorption isotherm, which is analyzed by a so-called BJH method to calculate the relation between the pore diameter and the pore volume. Here, the BJH method is a method to determine the distribution of the pore volume to the cylindrical pore size in accordance with a standard model by Barrett-Joyner-Halenda (J.A.C.S., 73(1951)373–377). Further, the specific surface area is calculated by analyzing said nitrogen adsorption isotherm within a relative pressure range of from 0.001 to 0.05 by BET multiple method. Here, BET method is a method for measuring the surface area by Brunaure-Emmett-Teller equation (J.A.C.S., 60(1938)309).

According to the present invention, an electric double layer capacitor having electrodes consisting essentially of the carbonaceous material having the above pore properties as the electrode material, is provided. More preferably, a capacitor using, as an electrolytic solution, an organic electrolytic solution having an electrolyte dissolved in an organic solvent, is provided.

As the electrolytic solution for the capacitor of the present invention, basically, either an aqueous electrolytic solution or an organic electrolytic solution may be employed. However, an organic electrolytic solution is particularly suitable since the amount of energy to be stored per unit volume will increase. The decomposition potential of an organic electrolytic solution is at least twice as high as that of an aqueous electrolytic solution, and accordingly, it is more advantageous to employ an organic electrolytic solution as compared with an aqueous electrolytic solution, from the viewpoint of the energy density which is in proportion to the half of the capacitance and the square of the voltage.

The carbonaceous material of the present invention has a large amount of pores having diameters of from 10 to 20 Å, which are larger than pores of the activated carbon to be usually obtained, consisting essentially of pores having diameters of less than 10 Å. Accordingly, even in the case of using an organic electrolytic solution having an electrolyte with a larger ion radius dissolved in an organic solvent, the electrolyte ions can freely go in and come out from the pores, whereby a high capacitance will be obtained. Here, as mentioned above, since the total pore volume is specified to be within an optimum range, the carbonaceous material will not be bulky, and a capacitor cell having a high energy density per unit volume can be formed.

More particularly, the electrode material for the electric double layer capacitor of the present invention, consists of the above carbonaceous material and a binder, and preferably an electroconductive material. The electrode is obtained, for example, in such a manner that a powder of the carbonaceous material and a binder such as polytetrafluoroethylene and preferably an electroconductive material, are kneaded in the presence of a solvent such as an alcohol, and formed into a sheet, followed by drying, and the sheet is bonded to a current collector by means of e.g. an electroconductive adhesive. Further, a powder of the carbonaceous material and a binder and preferably an electroconductive material may be mixed with a solvent to obtain a slurry, which is then coated on a current collector metal foil, followed by drying, to obtain an electrode incorporated with the current collector.

As the binder, polytetrafluoroethylene, polyvinylidene fluoride, a fluoroolefin/vinyl ether copolymerized crosslinked polymer, carboxymethylcellulose, polyvinyl pyrrolidone, polyvinyl alcohol or polyacrylic acid may, for example, be used. The content of the binder in the electrode is preferably from about 0.5 to about 20 mass % based on the total amount of the carbonaceous material and the binder. If the content of the binder is less than 0.5 mass %, the strength of the electrode tends to be inadequate, and if it exceeds 20 mass %, the electrical resistance tends to increase and the capacitance tends to decrease. The amount of the binder incorporated is more preferably from 0.5 to 10 mass %, from the viewpoint of the balance between the capacitance and the strength of the electrode. Here, as the crosslinking agent for the crosslinked polymer, an amine, a polyamine, a polyisocyanate, a bisphenol or a peroxide is preferred.

As the electroconductive material, a powder of e.g. carbon black, natural graphite, artificial graphite, titanium oxide or ruthenium oxide may be used. Among them, Ketchen black or acetylene black as one type of carbon black is preferably used since the effect to improve electroconductivity is significant with a small amount.

The amount of the electroconductive material such as carbon black incorporated in the electrode, is preferably at least 5 mass %, particularly preferably at least 10 mass %, based on the total amount of the carbonaceous material powder and the electroconductive material, so as to increase electroconductivity. If the amount of the electroconductive material incorporated is too large, the ratio of the carbonaceous material incorporated will decrease, whereby the capacitance of the electrode will decrease, and accordingly, the amount of the electroconductive material incorporated in the electrode is preferably at most 40 mass %, particularly preferably at most 30 mass %.

The solvent for forming a slurry is preferably one capable of dissolving the above binder, and e.g. N-methylpyrrolidone, dimethylformamide, toluene, xylene isophorone, methyl ethyl ketone, ethyl acetate, methyl acetate, ethyl acetate, dimethyl phthalate, methanol, ethanol, isopropanol, butanol or water may optionally be selected.

The current collector for the electrode may be any current collector so long as it has electrochemical and chemical corrosion resistance. As the current collector for the electrode, stainless steel, aluminum, titanium, tantalum or nickel may, for example, be used. Among them, stainless steel and aluminum are preferred as a current collector from the viewpoint of both performance and price.

The current collector may be in a form of a foil, may be a foam metal of nickel or aluminum having a three-dimensional structure, or may be a net or a wool of stainless steel.

As the electrolytic solution for the electric double layer capacitor of the present invention, a known or well-known aqueous or organic electrolytic solution may be used. However, the most preferred result will be obtained when an organic electrolytic solution is used.

As the organic solvent, at least one solvent selected from the group consisting of electrochemically stable ethylene carbonate, propylene carbonate, butylene carbonate, γ-butyrolactone, sulfolane, a sulfolane derivative, 3-methylsulfolane, 1,2-dimethoxyethane, acetonitrile, glutaronitrile, valeronitrile, dimethylformamide, dimethylsulfoxide, tetrahydrofuran, dimethoxyethane, methylformate, dimethyl carbonate, diethyl carbonate and ethyl methyl carbonate, is preferred. They may be used as a mixture.

In the case where both positive and negative electrodes consist mainly of the carbonaceous material having a high specific surface area of the present invention, as the electrolyte for the organic electrolytic solution, preferred is a salt comprising a quaternary onium cation represented by $R^1R^2R^3R^4N^+$ or $R^1R\ 2R^3R^4P^+$ (wherein each of $R^1$, $R^2$, $R^3$ and $R^4$ which are independent of one another, is a $C_{1-6}$ alkyl group) and at least one anion selected form the group consisting of $BF_4^-$, $PF_4^-$, $ClO_4^-$, $CF_3SO_3^-$ and $(SO_2R^5)(SO_2R^6)N^-$ (wherein each of $R^5$ and $R^6$ which are independent of each other, is a $C_{1-4}$ alkyl group or alkylene group, and $R^5$ and $R^6$ may form a ring).

Specific examples of the preferred electrolyte include $(C_2H_5)_4NBF_4$, $(C_2H_5)_3(CH_3)NBF_4$, $(C_2HS)_4PBF_4$ and $(C_2H_5)_3(CH_3)PBF_4$. The concentration of such a salt in the electrolytic solution is preferably from 0.1 to 2.5 mol/l, more preferably from about 0.5 to about 2 mol/l.

As the separator to be interposed between the positive electrode and the negative electrode in the present invention, e.g. polypropylene fiber non-woven fabric, glass fiber non-woven fabric or synthetic cellulose paper may be suitably used.

The electric double layer capacitor of the present invention may have any structure of a coin type wherein a pair of sheet electrodes with a separator interposed therebetween is accommodated in a metal case together with an electrolytic solution, a wound type wherein a pair of positive and negative electrodes is wound with a separator interposed therebetween, and a laminate type wherein a plurality of sheet electrodes are laminated with a separator interposed therebetween.

Now, the present invention will be described in further detail with reference to Examples and Comparative Example However, it should be understood that the present invention is by no means restricted to such specific Examples.

In Examples and Comparative Examples, the pore diameter, the pore volume and the specific surface area were measured by using Autosorb-1 manufactured by Quantachrome as follows.

The pore diameter and the pore volume were obtained in such a manner that a sample having preliminarily dried in vacuum at 200° C. for at least 12 hours, was provided to nitrogen gas adsorption at a temperature of liquid nitrogen to obtain an adsorption isotherm, which was analyzed by BJH method to calculate the relation between the pore diameter and the pore volume. Further, the specific surface area was calculated by analyzing said nitrogen gas adsorption isotherm within a relative pressure range of from 0.001 to 0.05 by BET multiple method.

EXAMPLE 1

(1) To a phenolic resin A which contains, as volatile components, a dimer and a trimer of polymer units constituting the phenolic resin, having a boiling point within a range of from 180 to 350° C., and which has a viscosity of 5 Pa·s at 25° C., 10 parts by mass of hexamethylenetetramine as a curing agent was added, followed by kneading by a kneader, and the kneaded product was cured in the air while raising the temperature from room temperature to 250° C.

Then, the cured product was pulverized by a hammer mill to have particle sizes of not larger than several mm, which was then held in a stream of nitrogen for 2 hours while raising the temperature till 600° C. by using a rotary kiln for carbonization in a nitrogen atmosphere. At this time, the mass reduction from room temperature till 400° C. was 15 mass %. Further, the carbonized product was activated at 800° C. for 4 hours in a stream of a nitrogen gas containing saturated steam at 40° C. The mass reduction was 45 mass % in the activation. After the activation, the activated product was pulverized to an average particle size of 5 μm by using a ball mill, to obtain a carbonaceous material A.

Of the carbonaceous material A, the specific surface area was 1,500 m²/g, the total pore volume was 0.95 cm³/g, the ratio of the volume of pores having diameters of from 10 to 20 Å was 20% based on the total pore volume, the ratio of the volume of pores having diameters of from 20 to 200 Å was 48% based on the total pore volume, and the ratio of the volume of pores having diameters exceeding 200 Å was 7% based on the total pore volume.

(2) A mixture comprising 80 mass % of the carbonaceous material A, 10 mass % of furnace black (Ketchen black EC manufactured by Ketchen Black International) as an electroconductive material, and 10 mass % of polytetrafluoroethylene as a binder, was kneaded while adding ethanol thereto, followed by rolling to obtain an electrode sheet having a thickness of 0.65 mm, followed by drying at 200° C. for 2 hours. Two electrodes having a diameter of 12 mm, as a positive electrode and a negative electrode, were stamped from the sheet, and bonded to a case and a lid made of stainless 316 by means of a graphite particles-containing electroconductive adhesive.

The lid and the case were dried under vacuum at 250° C. for 4 hours, and then a propylene carbonate solution containing $(C_2Hs)_3(CH_3)NBF_4$ at a concentration of 1 mol/l was impregnated into the electrodes in a dry argon atmosphere. Then, both electrodes were disposed so that they face each other by means of a non-woven fabric separator made of polypropylene interposed therebetween, followed by caulking by using an insulating gasket made of polypropylene. This coin type electric double layer capacitor had a diameter of 18.3 mm and a thickness of 2.0 mm.

To the finished coin type electric double layer capacitor, a voltage of 2.5 V was applied to measure the capacitance and the internal resistance. As a result, the capacitance and the internal resistance were 4.32 F and 8.2 Ω, respectively.

EXAMPLE 2

(1) 3 mass % by ethylene glycol as a solvent was mixed with the phenolic resin A of Example 1, to obtain a liquid resin B having a viscosity of 2 Pa·s at 25° C. A carbonaceous material B was obtained from the resin B under the same condition as in Example 1 except that the activation temperature was 850° C. The mass reduction till 400° C. in the carbonization was 18 mass %, and the mass reduction in the activation was 65 mass %. Of the carbonaceous material B, the specific surface area was 1,900 m²/g, the total pore volume was 1.44 cm³/g, the ratio of the volume of pores having diameters of from 10 to 20 Å was 35% based on the total pore volume, the ratio of the volume of pores having diameters of from 20 to 200 Å was 40% based on the total pore volume, and the ratio of the volume of pores having diameters exceeding 200 Å was 5% based on the total pore volume.

(2) A coin type electric double layer capacitor was prepared in the same manner as in Example 1 except that the carbonaceous material B was used and $(C_2H_5)_4NBF_4$ was used instead of $(C_2H_5)_3(CH_3)NBF_4$, and its properties were evaluated.

To the finished coin type electric double layer capacitor, a voltage of 2.5 V was applied to measure the capacitance and the internal resistance. As a result, the capacitance and the internal resistance were 4.10 F and 7.8 Ω, respectively.

EXAMPLE 3

(1) A carbonaceous material C was obtained under the same condition as in Example 1 except that the phenolic resin of Example 2 was subjected to intermediate holding at 200° C. for 30 minutes during the curing. The mass reduction till 400° C. in the carbonization was 10 mass %, and the mass reduction in the activation was 50 mass %. Of the carbonaceous material C, the specific surface area was 1,800 m$^2$/g, the total pore volume was 0.85 cm$^3$/g, the ratio of the volume of pores having diameters of from 10 to 20 Å was 32% based on the total pore volume, the ratio of the volume of pores having diameters of from 20 to 200 Å was 30% based on the total pore volume, and the ratio of the volume of pores having diameters exceeding 200 Å was 4% based on the total pore volume.

(2) A coin type electric double layer capacitor was prepared by using the carbonaceous material C in the same manner as in Example 1, and its properties were evaluated.

To the finished coin type electric double layer capacitor, a voltage of 2.5 V was applied to measure the capacitance and the internal resistance. As a result, the capacitance and the internal resistance were 3.75 F and 8.7 Ω, respectively.

EXAMPLE 4

(1) A carbonaceous material D was obtained from the phenolic resin B of Example 2 under the same condition as in Example 1 except that the activation duration was 6 hours. The mass reduction till 400° C. in the carbonization was 18 mass %, and the mass reduction in the activation was 69 mass %. Of the carbonaceous material D, the specific surface area was 2,060 m$^2$/g, the total pore volume was 1.36 cm$^3$/g, the ratio of the volume of pores having diameters of from 10 to 20 Å was 51% based on the total pore volume, the ratio of the volume of pores having diameters of from 20 to 200 Å was 28% based on the total pore volume, and the ratio of the volume of pores having diameters exceeding 200 Å was 2% based on the total pore volume.

(2) A coin type electric double layer capacitor was prepared in the same manner as in Example 1 except that the carbonaceous material D was used and $(C_2HS)_4NBF_4$ was used instead of $(C_2H_5)_3(CH_3)NBF_4$, and its properties were evaluated.

To the finished coin type electric double layer capacitor, a voltage of 2.5 V was applied to measure the capacitance and the internal resistance. As a result, the capacitance and the internal resistance were 3.94 F and 12.0 Ω, respectively.

EXAMPLE 5

(1) 10 Parts by mass of a resol resin was mixed with the phenolic resin of Example 2 to obtain a liquid resin E having a viscosity of 12 Pa·s at 25° C. A carbonaceous material E was obtained from the resin E under the same condition as in Example 1 except that the curing duration was reduced to half, and the activation temperature was 850° C. The mass reduction till 400° C. in the carbonization was 22 mass %, and the mass reduction in the activation was 66 mass %. Of the carbonaceous material E, the specific surface area was 2,100 m$^2$/g, the total pore volume was 1.81 cm$^3$ μg, the ratio of the volume of pores having diameters of from 10 to 20 Å was 38% based on the total pore volume, the ratio of the volume of pores having diameters of from 20 to 200 Å was 45% based on the total pore volume, and the ratio of the volume of pores having diameters exceeding 200 Å was 6% based on the total pore volume.

(2) A coin type electric double layer capacitor was prepared by using the carbonaceous material E in the same manner as in Example 1, and its properties were evaluated.

To the finished coin type electric double layer capacitor, a voltage of 2.5 V was applied to measure the capacitance and the internal resistance. As a result, the capacitance and the internal resistance were 3.94 F and 12.0 Ω, respectively.

EXAMPLE 6

(1) 10 masse of hexamethylenetetramine as a curing agent was added to the phenolic resin A of Example 1, and 0.25 mass % of salicylic acid as a curing accelerator was further mixed therewith, to obtain a liquid resin F having a viscosity of 11 Pa·s at 25° C. A carbonaceous material F was obtained from the resin F under the same condition as in Example 1. The mass reduction till 400° C. in the carbonization was 18 mass %. Of the activated carbon, the specific surface area was 1,600 m$^2$/g, the total pore volume was 0.97 cm$^3$/g, the ratio of the volume of pores having diameters of from 10 to 20 Å was 22% based on the total pore volume, the ratio of the volume of pores having diameters of from 20 to 200 Å was 53% based on the total pore volume, and the ratio of the volume of pores having diameters exceeding 200 Å was 5% based on the total pore volume.

(2) A coin type electric double layer capacitor was prepared by using the carbonaceous material F in the same manner as in Example 1, and its properties were evaluated.

To the finished coin type electric double layer capacitor, a voltage of 2.5 V was applied to measure the capacitance and the internal resistance. As a result, the capacitance and the internal resistance were 3.94 F and 9.5 Ω, respectively.

EXAMPLE 7

(1) 10 mass % of hexamethylenetetramine as a curing-agent was added to the phenolic resin A of Example 1, and 0.25 mass % of oxalic acid as a curing accelerator was further mixed therewith, to obtain a liquid resin G having a viscosity of 11.5 Pa·s at 25° C. A carbonaceous material G was obtained from the resin G under the same condition as in Example 1. The mass reduction till 400° C. in the carbonization was 19 mass %. Of the activated carbon, the specific surface area was 1,620 m$^2$/g, the total pore volume was 0.93 cm$^3$/g, the ratio of the volume of pores having diameters of from 10 to 20 Å was 25% based on the total pore volume, the ratio of the volume of pores having diameters of from 20 to 200 Å was 51% based on the total pore volume, and the ratio of the volume of pores having diameters exceeding 200 Å was 6% based on the total pore volume.

(2) A coin type electric double layer capacitor was prepared by using the carbonaceous material G in the same manner as in Example 1, and its properties were evaluated.

To the finished coin type electric double layer capacitor, a voltage of 2.5 V was applied to measure the capacitance and the internal resistance. As a result, the capacitance and the internal resistance were 3.88 F and 9.1 Ω, respectively.

EXAMPLE 8

(1) 10 mass % of hexamethylenetetramine as a curing agent was added to the phenolic resin A of Example 1, and 5 mass % of propylene glycol as a solvent was mixed therewith, to obtain a liquid resin H having a viscosity of 3.5 Pa·s at 25° C. A carbonaceous material H was obtained from the resin H under the same condition as in Example 1. The mass reduction till 400° C. in the carbonization was 33 mass %. Of the activated carbon, the specific surface area was 1,800 m$^2$/g, the total pore volume was 1.25 cm$^3$/g, the ratio of the volume of pores having diameters of from 10 to 20 Å was 18% based on the total pore volume, the ratio of the volume of pores having diameters of from 20 to 200 Å was 61% based on the total pore volume, and the ratio of the volume of pores having diameters exceeding 200 Å was 3% based on the total pore volume.

(2) A coin type electric double layer capacitor was prepared by using the carbonaceous material H in the same manner as in Example 1, and its properties were evaluated.

To the finished coin type electric double layer capacitor, a voltage of 2.5 V was applied to measure the capacitance and the internal resistance. As a result, the capacitance and the internal resistance were 3.51 F and 8.8 Ω, respectively.

COMPARATIVE EXAMPLE 1

(1) The dimer and trimer of polymer units constituting the phenolic resin were removed from the resin A of Example 1 by recycle preparative GPC, and 15 mass % of ethylene glycol as a solvent was added thereto to obtain a liquid resin I having a viscosity of 0.08 Pa·s at 25° C. A carbonaceous material I was obtained from the resin I under the same condition as in Example 1. The mass reduction till 400° C. in the carbonization was 6 mass %, and the mass reduction in the activation was 50 mass %. Of the carbonaceous material I, the specific surface area was 1,500 m$^2$/g, the total pore volume was 0.73 cm$^3$/g, the ratio of the volume of pores having diameters of from 10 to 20 Å was 24% based on the total pore volume, the ratio of the volume of pores having diameters of from 20 to 200 Å was 10% based on the total pore volume, and the ratio of the volume of pores having diameters exceeding 200 Å was 1% based on the total pore volume.

(2) A coin type electric double layer capacitor was prepared by using the carbonaceous material I in the same manner as in Example 1, and its properties were evaluated.

To the finished coin type electric double layer capacitor, a voltage of 2.5 V was applied to measure the capacitance and the internal resistance. As a result, the capacitance and the internal resistance were 2.65 F and 12.2 Ω, respectively.

COMPARATIVE EXAMPLE 2

(1) Ethylene glycol was removed from the resin A of Example 1 by recycle preparative GPC to obtain a liquid resin J having a viscosity of 120 Pa·s at 25° C. A carbonaceous material J was obtained from the resin J under the same condition as in Example 1. The mass reduction till 400° C. in the carbonization was 5 mass %, and the mass reduction in the activation was 25 mass %. Of the carbonaceous material J, the specific surface area was 900 m$^2$/g, the total pore volume was 0.41 cm$^3$/g, the ratio of the volume of pores having diameters of from 10 to 20 Å was 20% based on the total pore volume, the ratio of the volume of pores having diameters of from 20 to 200 Å was 8% based on the total pore volume, and the ratio of the volume of pores having diameters exceeding 200 Å was 2% based on the total pore volume.

(2) A coin type electric double layer capacitor was prepared by using the carbonaceous material J in the same manner as in Example 1, and its properties were evaluated.

To the finished coin type electric double layer capacitor, a voltage of 2.5 V was applied to measure the capacitance and the internal resistance. As a result, the capacitance and the internal resistance were 1.13 F and 20.1 Ω, respectively.

COMPARATIVE EXAMPLE 3

(1) Ethylene glycol was removed in an amount of 10 μm mass % from the resin I of Comparative Example 1 by recycle preparative GPC, and 5 mass % of distilled water having a boiling point of 100° C. as a volatile component was added thereto to obtain a liquid resin K having a viscosity of 0.5 Pa·s at 25° C. A carbonaceous material K was obtained from the resin K under the same condition as in Example 1. The mass reduction till 400° C. in the carbonization was 5 mass %, and the mass reduction in the activation was 52 mass %.

Of the carbonaceous material K, the specific surface area was 1,600 m$^2$/g, the total pore volume was 0.70 cm$^3$/g, the ratio of the volume of pores having diameters of from 10 to 20 Å was 20% based on the total pore volume, the ratio of the volume of pores having diameters of from 20 to 200 Å was 4% based on the total pore volume, and the ratio of the volume of pores having diameters exceeding 200 Å was 1% based on the total pore volume.

(2) A coin type electric double layer capacitor was prepared by using the carbonaceous material K in the same manner as in Example 1, and its properties were evaluated.

To the finished coin type electric double layer capacitor, a voltage of 2.5 V was applied to measure the capacitance and the internal resistance. As a result, the capacitance and the internal resistance were 2.80 F and 13.5 Ω, respectively.

COMPARATIVE EXAMPLE 4

(1) To the resin J of Comparative Example 2, 5 mass % of ethylene glycol was added, and 3 mass % of a tetracyclic polyaromatic compound having a boiling point within a range of from 390 to 460° C. as a volatile component was added, to obtain a liquid resin L having a viscosity of 80 Pa·s at 25° C. A carbonaceous material L was obtained from the resin L under the same condition as in Example 1. The mass reduction till 400° C. in the carbonization was 8 mass %, and the mass reduction in the activation was 67 mass %.

Of the carbonaceous material L, the specific surface area was 2,050 m$^2$/g, the total pore volume was 0.89 cm$^3$/g, the ratio of the volume of pores having diameters of from 10 to 20 Å was 25% based on the total pore volume, the ratio of the volume of pores having diameters of from 20 to 200 Å was 5% based on the total pore volume, and the ratio of the volume of pores having diameters exceeding 200 Å was 1% based on the total pore volume.

(2) A coin type electric double layer capacitor was prepared by using the carbonaceous material L in the same manner as in Example 1, and its properties were evaluated.

To the finished coin type electric double layer capacitor, a voltage of 2.5 V was applied to measure the capacitance and the internal resistance. As a result, the capacitance and the internal resistance were 2.85 F and 11.5 Ω, respectively.

COMPARATIVE EXAMPLE 5

(1) A carbonaceous material M was obtained by using the resin A of Example 1 under the same condition as in Example 1 except that the curing time was tripled. The mass reduction till 400° C. in the carbonization was 1 mass %, and the mass reduction in the activation was 40 mass %.

Of the carbonaceous material M, the specific surface area was 1,300 m$^2$/g, the total pore volume was 0.64 cm$^3$/g, the ratio of the volume of pores having diameters of from 10 to 20 Å was 15% based on the total pore volume, the ratio of the volume of pores having diameters of from 20 to 200 Å was 2% based on the total pore volume, and the ratio of the volume of pores having diameters exceeding 200 Å was 0.5% based on the total pore volume.

(2) A coin type electric double layer capacitor was prepared by using the carbonaceous material M in the same manner as in Example 1, and its properties were evaluated.

To the finished coin type electric double layer capacitor, a voltage of 2.5 V was applied to measure the capacitance and the internal resistance. As a result, the capacitance and the internal resistance were 1.95 F and 15.6 Ω, respectively.

COMPARATIVE EXAMPLE 6

(1) A carbonaceous material N was obtained by using a phenolic resin N having a viscosity of 5 Pa·s at 25° C. and containing a volatile component having a boiling point within a range of from 180 to 350° C., under the same condition as in Example 1. The mass reduction till 400° C. in the carbonization was 51 mass %, and the mass reduction in the activation was 77 mass %.

Of the carbonaceous material N, the specific surface area was 1,200 m$^2$/g, the total pore volume was 2.55 cm$^3$/g, the ratio of the volume of pores having diameters of from 10 to 20 Å was 9% based on the total pore volume, the ratio of the volume of pores having diameters of from 20 to 200 Å was 65% based on the total pore volume, and the ratio of the volume of pores having diameters exceeding 200 Å was 22% based on the total pore volume.

(2) A coin type electric double layer capacitor was prepared by using the carbonaceous material N in the same manner as in Example 1, and its properties were evaluated.

To the finished coin type electric double layer capacitor, a voltage of 2.5 V was applied to measure the capacitance and the internal resistance. As a result, the capacitance and the internal resistance were 1.54 F and 27.5 Ω, respectively.

COMPARATIVE EXAMPLE 7

(1) To the resin J of Comparative Example 2, 5 mass % of ethylene glycol was added to obtain a liquid resin O having a viscosity of 35 Pa·s at 25° C. A carbonaceous material O was obtained from the resin O under the same condition as in Example 1. The mass reduction till 400° C. in the carbonization was 1 mass %, and the mass reduction in the activation was 64 mass %.

Of the carbonaceous material O, the specific surface area was 1,800 m$^2$/g, the total pore volume was 0.85 cm$^3$/g, the ratio of the volume of pores having diameters of from 10 to 20 Å was 21% based on the total pore volume, the ratio of the volume of pores having diameters of from 20 to 200 Å was 8% based on the total pore volume, and the ratio of the volume of pores having diameters exceeding 200 Å was 2% based on the total pore volume.

(2) A coin type electric double layer capacitor was prepared by using the carbonaceous material O in the same manner as in Example 1, and its properties were evaluated.

To the finished coin type electric double layer capacitor, a voltage of 2.5 V was applied to measure the capacitance and the internal resistance. As a result, the capacitance and the internal resistance were 2.26 F and 9.5 Ω, respectively.

COMPARATIVE EXAMPLE 8

(1) To the resin A of Example 1, 20 parts by mass of a resol resin was added to obtain a liquid resin P having a viscosity of 0.7 Pa·s at 25° C. A carbonaceous material P was obtained from the resin P under the same condition as in Example 1 except that no curing agent was added. The mass reduction till 400° C. in the carbonization was 59 mass %, and the mass reduction in the activation was 25 mass %.

Of the carbonaceous material P, the specific surface area was 1,750 m$^2$/g, the total pore volume was 2.51 cm$^3$/g, the ratio of the volume of pores having diameters of from 10 to 20 Å was 8% based on the total pore volume, the ratio of the volume of pores having diameters of from 20 to 200 Å was 65% based on the total pore volume, and the ratio of the volume of pores having diameters exceeding 200 Å was 17% based on the total pore volume.

(2) A coin type electric double layer capacitor was prepared by using the carbonaceous material P in the same manner as in Example 1, and its properties were evaluated.

To the finished coin type electric double layer capacitor, a voltage of 2.5 V was applied to measure the capacitance and the internal resistance. As a result, the capacitance and the internal resistance were 1.39 F and 24.3 Ω, respectively.

COMPARATIVE EXAMPLE 9

(1) Ethylene glycol was removed in an amount of 2 mass % from the resin I of Comparative Example 1 by recycle preparative GPC to obtain a liquid resin Q having a viscosity of 1 Pa·s at 25° C. A carbonaceous material Q was obtained from the resin Q under the same condition as in Example 1 except that no curing was added. The mass reduction till 400° C. in the carbonization was 52 mass %, and the mass reduction in the activation was 44 mass %.

Of the carbonaceous material Q, the specific surface area was 1,500 m$^2$/g, the total pore volume was 1.61 cm$^3$/g, the ratio of the volume of pores having diameters of from 10 to 20 Å was 18% based on the total pore volume, the ratio of the volume of pores having diameters of from 20 to 200 Å was 60% based on the total pore volume, and the ratio of the volume of pores having diameters exceeding 200 Å was 20% based on the total pore volume.

(2) A coin type electric double layer capacitor was prepared by using the carbonaceous material Q in the same manner as in Example 1, and its properties were evaluated.

To the finished coin type electric double layer capacitor, a voltage of 2.5 V was applied to measure the capacitance and the internal resistance. As a result, the capacitance and the internal resistance were 2.10 F and 19.5 Ω, respectively.

COMPARATIVE EXAMPLE 10

(1) To the phenolic resin A of Example 1, 0.5 mass % of hexamethylenetetramine as a curing agent was added to obtain a liquid resin R having a viscosity of 4.5 Pa·s at 25° C. A carbonaceous material R was obtained from the resin R under the same condition as in Example 1. The mass reduction till 400° C. in the carbonization was 27 mass %. Of the activated carbon, the specific surface area was 1,050 m$^2$/g, the total pore volume was 0.75 cm$^3$/g, the ratio of the volume of pores having diameters of from 10 to 20 Å was 18% based on the total pore volume, the ratio of the volume of pores having diameters of from 20 to 200 Å was 61% based on the total pore volume, and the ratio of the volume of pores having diameters exceeding 200 Å was 3% based on the total pore volume.

(2) A coin type electric double layer capacitor was prepared by using the carbonaceous material R in the same manner as in Example 1, and its properties were evaluated.

To the finished coin type electric double layer capacitor, a voltage of 2.5 V was applied to measure the capacitance and the internal resistance. As a result, capacitance and the internal resistance were 1.32 F and 22.5 µl, respectively.

The results in Examples and Comparative Examples are shown in Table 1.

TABLE 1

| | Ratio of pore volume based on the total pore volume | | | Total pore volume | Specific surface area | Capacitance | Internal resistance |
|---|---|---|---|---|---|---|---|
| | 10–20 Å | 20–200 Å | Over 200 Å | (cm³/g) | (m²/g) | (F) | (Ω) |
| Example 1 | 20 | 48 | 7 | 0.95 | 1500 | 4.32 | 8.2 |
| Example 2 | 35 | 40 | 5 | 1.44 | 1900 | 4.10 | 7.8 |
| Example 3 | 32 | 30 | 4 | 0.85 | 1800 | 3.75 | 8.7 |
| Example 4 | 51 | 28 | 2 | 1.36 | 2060 | 4.52 | 10.5 |
| Example 5 | 38 | 45 | 6 | 1.81 | 2100 | 3.94 | 12.0 |
| Example 6 | 22 | 53 | 5 | 0.97 | 1600 | 3.94 | 9.5 |
| Example 7 | 25 | 51 | 6 | 0.93 | 1620 | 3.88 | 9.1 |
| Example 8 | 18 | 61 | 3 | 1.25 | 1800 | 3.51 | 8.8 |
| Comparative Example 1 | 24 | 10 | 1 | 0.73 | 1500 | 2.65 | 12.2 |
| Comparative Example 2 | 20 | 8 | 2 | 0.41 | 900 | 1.13 | 10.2 |
| Comparative Example 3 | 20 | 4 | 1 | 0.70 | 1600 | 2.80 | 13.5 |
| Comparative Example 4 | 25 | 5 | 1 | 0.89 | 2050 | 2.85 | 11.5 |
| Comparative Example 5 | 15 | 2 | 0.5 | 0.64 | 1300 | 1.95 | 15.5 |
| Comparative Example 6 | 9 | 65 | 22 | 2.55 | 1200 | 1.54 | 27.5 |
| Comparative Example 7 | 21 | 8 | 2 | 0.85 | 1800 | 2.26 | 9.5 |
| Comparative Example 8 | 8 | 65 | 17 | 2.51 | 1750 | 1.39 | 24.3 |
| Comparative Example 9 | 18 | 60 | 20 | 1.61 | 1500 | 2.1 | 19.5 |
| Comparative Example 10 | 18 | 61 | 21 | 0.75 | 1050 | 1.32 | 22.5 |

In the carbonaceous material of the present invention, the volume of micropores which mainly contribute to appearance of the capacitance, and the volume of mesopores which mainly contribute as a pool of electrolyte ions, are optimized. Accordingly, the electrode for an electric double layer capacitor, which consists mainly of said carbonaceous material, will not be bulky, and an electric double layer capacitor having a high capacitance per unit volume and having a low internal resistance, can be provided.

What is claimed is:

1. A carbonaceous material which has a total pore volume of from 0.5 to 1.5 cm³/g per unit mass, a volume of micropores having diameters of from 10 to 20 Å of from 10 to 45% based on the total pore volume, a volume of mesopores having diameters of from 20 to 200 Å of from 35 to 65% based on the total pore volume, a volume of macropores having diameters exceeding 200 Å of not more than 15% based on the total pore volume, and a specific surface area of from 1,000 to 2,500 m²/g.

2. The carbonaceous material of claim 1, wherein the volume of micropores having diameters of from 10 to 20 Å is from 10 to 25% based on the total pore volume.

3. The carbonaceous material of claim 1, wherein the volume of mesopores having diameters of from 20 to 200 Å is from 40 to 60% based on the total pore volume.

4. The carbonaceous material of claim 1, wherein the volume of macropores having diameters exceeding 200 Å is not more than 10% based on the total pore volume.

5. The carbonaceous material of claim 1, wherein the specific surface area is from 1,000 to 2,200 m²/g.

6. The carbonaceous material of claim 5, wherein the specific surface area is from 1,000 to 1,500 m²/g.

7. The carbonaceous material of claim 1, having a total pore volume of from 0.85 to 1.44 cm³/g.

8. The carbonaceous material of claim 5, having a specific surface area of from 1,500 to 2,100 m²/g.

9. An electric double layer capacitor having electrodes comprising a carbonaceous material having a total pore volume of from 0.5 to 1.5 cm³/g per unit mass; a volume of micropores having diameters of from 10 to 20 Å of from 10 to 45% based on the total pore volume, a volume of mesopores having diameters of from 20 to 200 Å of from 35 to 65% based on the total pore volume; a volume of macropores having diameters exceeding 200 Å of not more than 15% based on the total pore volume, and a specific surface area of from 1,000 to 2,500 m²/g.

10. The electric double layer capacitor of claim 9, which has an organic electrolytic solution.

11. The electric double layer capacitor of claim 10, wherein the organic electrolytic solution contains at least one solvent selected from the group consisting of ethylene carbonate, propylene carbonate, butylene carbonate, dimethyl carbonate, ethyl methyl carbonate, diethyl carbonate, acetonitrile, glutaronitrile, valeronitrile, sulfolane and a 3-methylsulfolane, and a salt comprising a quaternary onium cation represented by $R^1R^2R^3R^4N^+$ or $R^1R^2R^3R^4P^+$, wherein each of $R^1$, $R^2$, $R^3$ and $R^4$, which is independent of one another, is a $C_{1-6}$ alkyl group, and at least one anion selected from the group consisting of $BF_4^-$, $PF_6^-$, $CO_4^-$, $CF_3SO_3^-$ and $(SO_2R^5)(SO_2R^6)N^-$, wherein each of $R^5$ and $R^6$, which is each independent of one another, is a $C_{1-4}$ alkyl group.

12. A process for producing an electric double layer capacitor having electrodes comprising a porous carbonaceous material and a binder, wherein the carbonaceous material is obtained by the steps of:
    (1) curing a liquid thermosetting resin which contains a volatile component having a boiling point of from 120 to 400° C. and which has a viscosity of from 0.1 to 100 Pa·s at 25° C., to obtain a cured product;
    (2) pulverizing the cured product;

(3) carbonizing the pulverized, cured product in a non-oxidizing atmosphere so that the mass reduction till 400° C. in the carbonization is from 2 to 50 mass % of the mass before carbonization, to obtain a carbonized product; and (4) activating the carbonized product.

13. The process of claim 12, wherein, in the step (1), a curing agent is added to the thermosetting resin, followed by kneading, and further, a curing accelerator is added thereto, followed by kneading to obtain a kneaded product, and then said kneaded product is cured to obtain a cured product.

14. The process of claim 13, wherein the curing agent is added in an amount of at least 1 mass % based on the thermosetting resin.

15. The process of claim 12, wherein the curing accelerator is added in an amount of at most 5 mass % based on the thermosetting resin.

16. The process of claim 12, wherein the thermosetting resin is a phenolic resin.

17. The process of claim 12, wherein after the step (4) has been completed, the carbonaceous material has a total pore volume of from 0.5 to 1.5 cm$^3$/g per unit mass, a volume of micropores having diameters of from 10 to 20 Å of from 10 to 45% based on the total pore volume, a volume of mesopores having diameters of from 20 to 200 Å of from 35 to 65% based on the total pore volume, a volume of macropores having diameters exceeding 200 Å of not more than 15% based on the total pore volume, and a specific surface area of from 1,000 to 2,500 m$^2$/g.

18. A process for producing a porous carbonaceous material, which comprises the steps of:

(1) curing a liquid thermosetting resin which contains a volatile component having a boiling point ranging from 150° to 380° C. and which has a viscosity ranging from 0.2 to 80 Pa·s at 25° C. to obtain a cured product;

(2) adding at least 1 mass % of a curing agent, based on the thermosetting resin;

(3) pulverizing the cured product;

(4) carbonizing the pulverized cured product in a non-oxidizing atmosphere so that the mass reduction which occurs upon heating up to a temperature of 400° C. during carbonization ranges from 2 to 50 mass % of the mass before carbonization, thereby obtaining a carbonized product; and (5) activating the carbonized product.

19. The process of claim 18, wherein after the addition of the curing agent to the thermosetting resin in step (2), kneading is effected and then a curing accelerator is added thereto, and then further kneading is effected, and then the kneaded product is cured to obtain a cured product.

20. The process of claim 19, wherein the curing accelerator is added in an amount of at most 5 mass % based on the thermosetting resin.

21. The process of claim 18, wherein the thermosetting resin is a phenolic resin.

22. The process of claim 18 wherein after the carbonized product has been activated in step (5), the carbonaceous material has a total pore volume ranging from 0.5 to 1.5 cm$^3$/g per unit mass, a volume of micropores having diameters ranging from 10 to 20 Å of from 10 to 45% based on the total pore volume, a volume of mesopores having diameters of from 20 to 200 Å ranging from 35 to 65% based on the total pore volume, a volume of macropores having diameters exceeding 200 Å of not more than 15% based on the total pore volume, and a specific surface area of from 1,000 to 2,500 m$^2$/g.

23. The process of claim 18, wherein the boiling point of the liquid thermosetting resin ranges from 180 to 350° C. and the viscosity of the liquid ranges from 0.5 to 50 Pa·s.

* * * * *